May 11, 1948.  J. A. MORRONE  2,441,437
KNOCK-DOWN GARDEN HOSE REEL
Filed Aug. 24, 1945  3 Sheets-Sheet 1
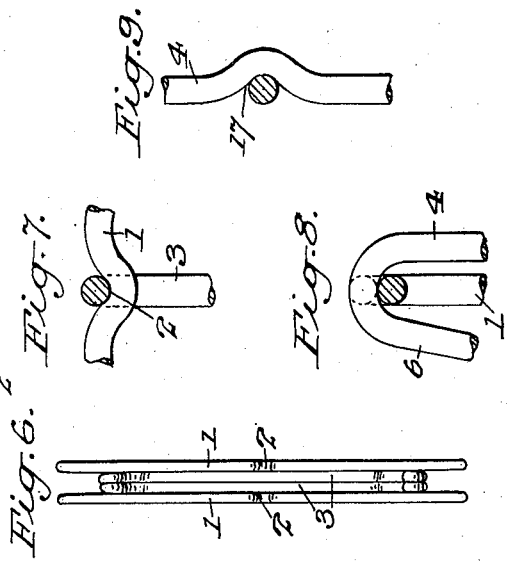
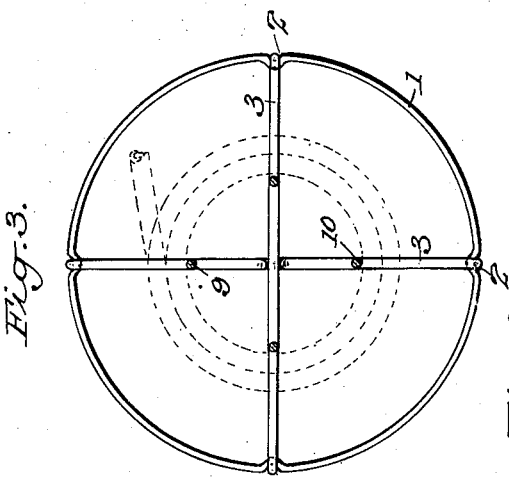
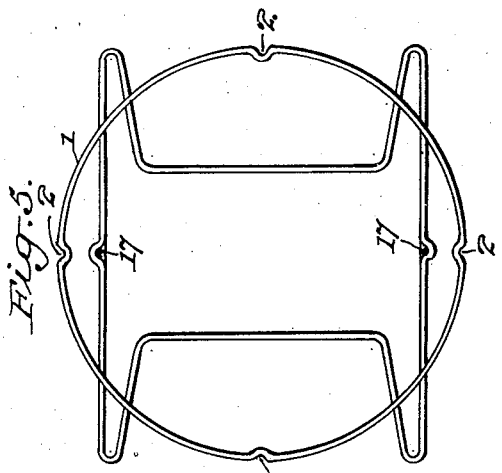
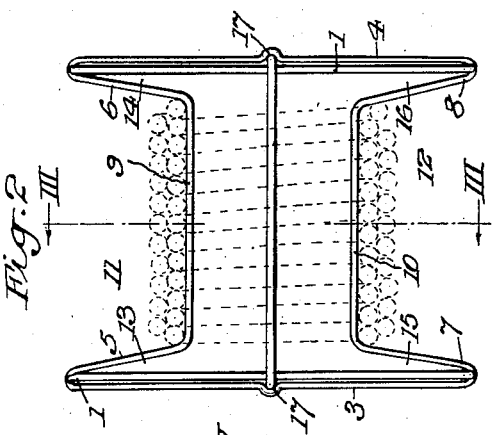
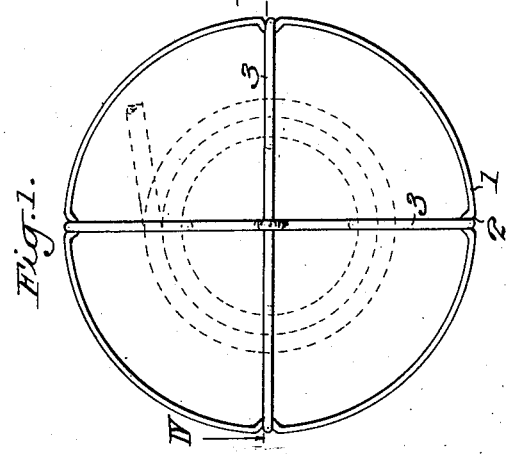
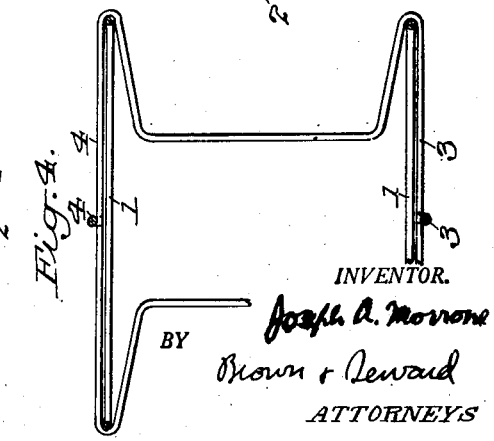
INVENTOR.
Joseph A. Morrone
BY
Brown + Seward
ATTORNEYS

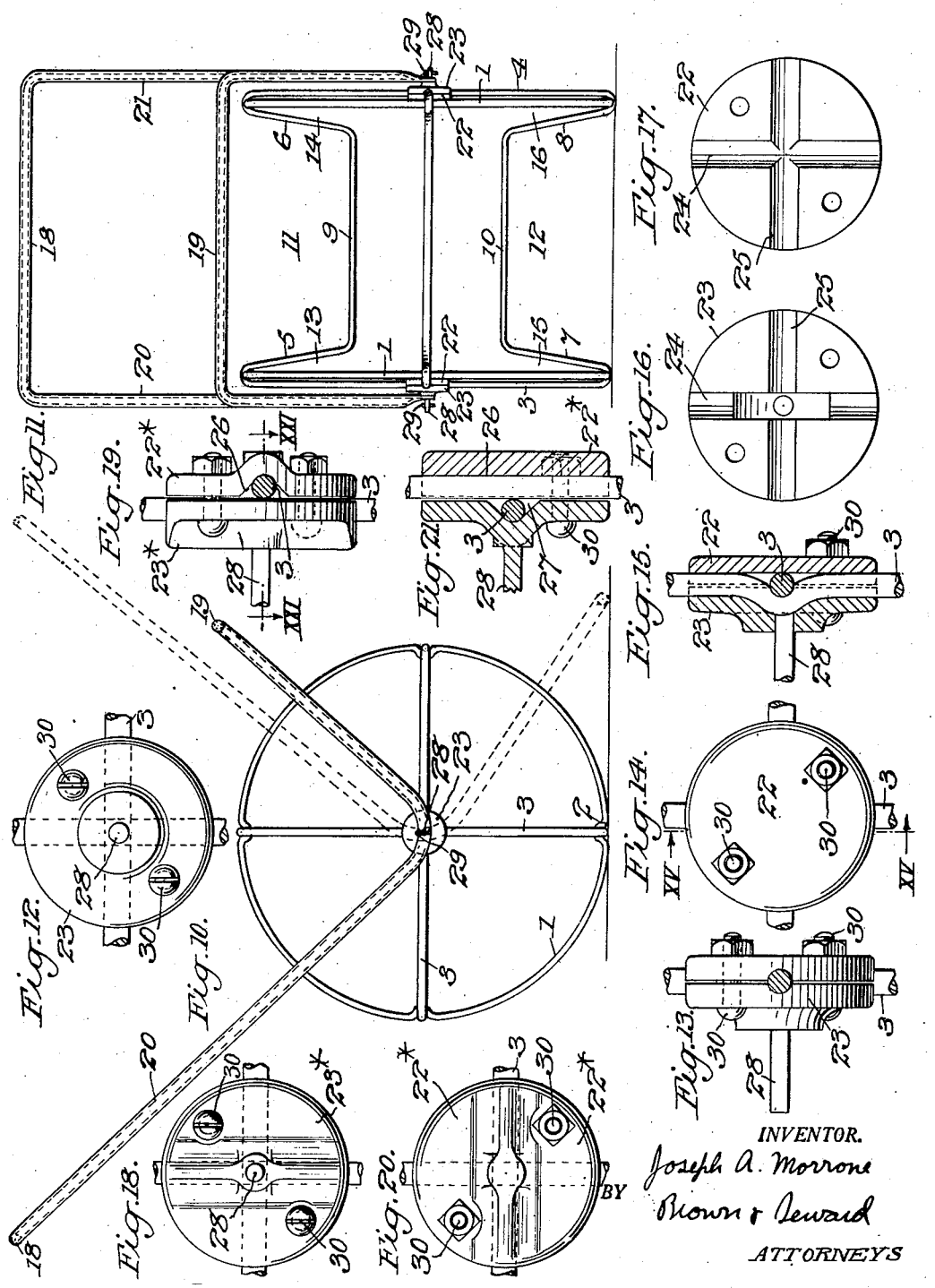

May 11, 1948.

J. A. MORRONE 2,441,437

KNOCK-DOWN GARDEN HOSE REEL

Filed Aug. 24, 1945 3 Sheets-Sheet 3

INVENTOR.
Joseph A. Morrone
BY Brown & Seward
ATTORNEYS

Patented May 11, 1948

2,441,437

UNITED STATES PATENT OFFICE 2,441,437

KNOCKDOWN GARDEN HOSE REEL

Joseph A. Morrone, Westerly, R. I.

Application August 24, 1945, Serial No. 612,362

6 Claims. (Cl. 242—86)

The object of my invention is to produce a knock-down garden hose reel comprising very few parts, which reel can be disassembled and packed in a small bundle for shipment or storage, and which may be readily reassembled.

A further object is to produce a reel which will be very strong and durable when assembled.

A still further object is to produce a reel which will be efficient in use and yet inexpensive to manufacture.

One part of my invention is directed to the hose winding elements and the other part of the invention to the elements for permitting the easy propulsion of the reel from point to point.

The first part of my invention includes two circular traction members or rings, preferably of rod construction removably connected by a plurality of hose winding members also preferably of rod construction, the said hose winding members being of resilient material to permit them to be forced over the traction members and snapped into recesses formed in the said traction members.

The second part of my invention is directed to a combined handle and support, preferably in loop form and of rod construction and pivoted to the crossed radial end portions of the hose winding members.

Practical embodiments of my invention are represented in the accompanying drawings, in which Fig. 1 represents a side elevation of the garden hose reel;

Fig. 2 represents a front elevation of the same;

Fig. 3 represents a vertical section taken in the plane of the line III—III of Fig. 2, looking in the direction of the arrows;

Fig. 4 represents a horizontal section taken in the plane of the line IV—IV of Fig. 1, looking in the direction of the arrows;

Fig. 5 represents a side elevation of the several members disassembled for purposes of shipment or storage;

Fig. 6 represents a front elevation of the same;

Figs. 7, 8 and 9 represent detail cross sections, on an enlarged scale of portions of the members of the reel which are locked together when assembled;

Fig. 10 represents a side elevation of the reel, on a scale similar to Figs. 1 to 6 inclusive, having means pivoted thereto by which the reel may be trundled.

Fig. 11 represents a front elevation of the same;

Fig. 12 represents a detail side elevation, on an enlarged scale, of one of the devices for locking certain of the members of the reel together at their intersections and forming a hub for journaling a combined handle and support by which the reel is trundled or supported at rest, as desired;

Fig. 13 represents a front elevation of the same;

Fig. 14 represents a rear elevation of the same;

Fig. 15 represents a vertical section taken in the plane of the line XV—XV of Fig. 14, looking in the direction of the arrows;

Figs. 16 and 17 represent interior face views of the hub members which form a part of one of the locking devices;

Fig. 18 represents a detail side elevation of another form of device for locking certain of the members of the reel together at their intersections to form trunnions for the propelling handle;

Fig. 19 represents a front elevation of the same;

Fig. 20 represents an inside elevation of the same;

Fig. 21 represents a horizontal section taken in the plane of the line XXI—XXI of Fig. 19, looking in the direction of the arrows;

Figure 23:
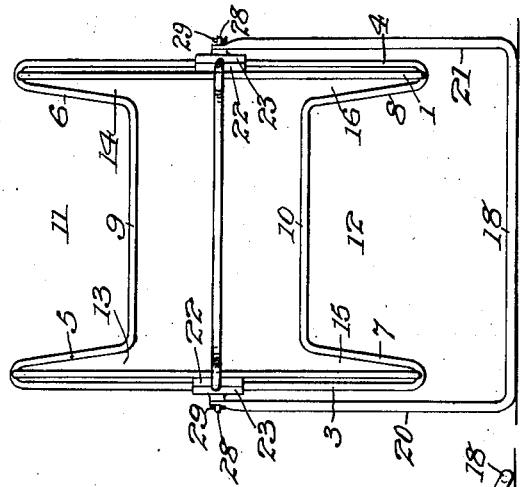
Fig. 23 represents a front view of the same.
Figure 22:
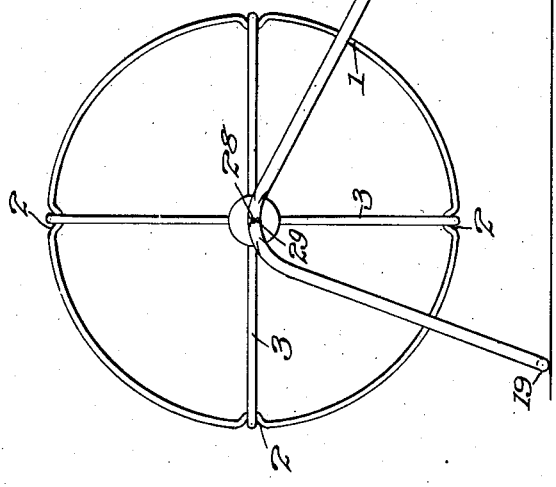
Fig. 22 represents a side elevation of the reel and its support with the parts in the positions they assume when the reel is positioned by the combined handle and support to permit the hose to be easily wound on and unwound from the reel.

The hose reel includes two resilient circular traction members or rings 1, of wire rod construction, each traction member being deformed at equally spaced intervals to form recesses 2.

The hose reel also includes a plurality of hose winding members of rod construction, in the present instance, two are shown at right angles to each other, which winding members are removably engaged with the circular traction members to assemble the members and hold them in position, as follows.

Each hose winding member comprises a rod bent to form two radial end portions 3, 4, four diagonal inwardly directed portions 5, 6 and 7, 8, the portions 5, 6 being connected by a transverse portion 9, and the portions 7, 8 being connected by a transverse portion 10. This arrangement provides two recesses 11, 12 for receiving and winding the hose and four tapered loops 13, 14, 15, 16 for receiving and holding an end of the hose.

To assemble the two circular traction members and the hose receiving members the outer ends of the tapered loops are forced over the circular members and snapped into the recesses 2.

If it be desired that the crossed radial end portions at each end of the hose winding members occupy the same plane at their crossing point the radial end portion of one member at each end thereof may be bent to form a recess 17 for receiving the adjacent radial end portion of the other hose winding member (see Fig. 2).

If it be desired that the crossed radial end portions at each end of the hose winding members occupy different planes at their crossing point, the recesses 17 may be omitted (see Figs. 18 to 21 inclusive).

If it be desired to provide the reel with a combined handle and support as shown in Figs. 10 and 11 it may be accomplished as follows:

The combined handle and support is shown in loop form and as of tube construction. It comprises transverse upper and lower portions 18 and 19 connected by side portions 20 and 21, the leg portion extending at substantially right angles from the hand portion. This combined handle and support is pivoted to the reel at the intersection of the hand and leg portions, as follows:

A two part hub serves to lock the radial end portions of the hose winding members together at their intersections. In Figs. 12 to 17 inclusive the inner and outer parts 22, 23 of the hub have matched grooves 24, 25 in their adjacent faces for receiving the radial end portions when they are crossed in the same plane, while in Figs. 18 to 21 inclusive the inner and outer parts 22*, 23* of the hub have grooves 26, 27 in their adjacent faces for receiving the radial end portions when they are crossed in different planes. In both instances the outer hub parts 23 or 23* are provided with outwardly projecting pins 28 on which the combined handle and support is journaled. Preferably the pins 28 project through the side portions 20, 21 of the combined holder and support and are there provided with cotter pins 29. These inner and outer parts of the hub may be clamped to their intersecting radial end portions by screw bolts 30.

From the above description it will be seen that the reel may be readily assembled or disassembled and that it comprises a minimum number of parts. Also that when the reel is disassembled the members may be compactly arranged for shipping or storing.

It is evident that various changes may be resorted to in the construction, form and arrangement of the several parts without departing from the spirit and scope of my invention, and hence I do not intend to be limited to the particular embodiments herein shown and described, but what I claim is:

1. In a knock-down hose reel, two circular resilient traction rings of rod construction, each ring having a plurality of equally spaced recesses, and a plurality of separate crossed hose winding members of rod construction snapped into said recesses to removably hold the traction rings and the hose winding members in their assembled positions.

2. In a knock-down hose reel, two circular resilient traction rings of rod construction, each ring being bent at equally spaced intervals to form recesses, and a plurality of separate crossed hose winding members removably snapped into said recesses to removably hold the traction rings and hose winding members in their assembled positions.

3. In a knock-down hose reel, two circular resilient traction rings of rod construction, each ring being bent at equally spaced intervals to form recesses, and a plurality of separate crossed hose winding members snapped into said recesses to removably hold the traction rings and hose winding members in their assembled positions, each hose winding member comprising a rod bent to form two radial end portions, four inwardly directed portions and two transverse portions.

4. In a knock-down hose reel, two circular resilient traction members of rod construction, a plurality of separate crossed hose winding members removably engaged with the traction members, each member comprising a rod bent to form two radial end portions, four inwardly directed portions and two transverse portions, hubs clamped to the end portions at their crossing points, and a combined handle and support pivoted to said hubs.

5. In a knock-down hose reel, a plurality of separate hose winding members, each member comprising a rod bent to form two radial end portions, four inwardly directed portions and two transverse portions, the radial end portions being crossed, and two part hubs embracing and removably clamped to the radial end portions at their crossing points.

6. In a knock-down hose reel, a plurality of separate hose winding members, each winding member comprising a rod bent to form two radial end portions, four inwardly directed portions and two transverse portions, the radial end portions being crossed, two part hubs embracing and removably clamped to the radial end portions at their crossing points, journal pins projecting from the outer parts of said hubs, and a combined handle and support removably pivoted on said journal pins between its ends.

JOSEPH A. MORRONE.

REFERENCES CITED

The following references are of record in the file of this patent:

UNITED STATES PATENTS

| Number | Name | Date |
|---|---|---|
| 351,688 | Buschman | Oct. 26, 1886 |
| 802,912 | Cary | Oct. 24, 1905 |
| 810,977 | Poure | Jan. 30, 1906 |
| 1,048,863 | Notman | Dec. 31, 1912 |
| 1,446,070 | Schane | Feb. 20, 1923 |
| 2,233,449 | Glenny | Mar. 4, 1941 |

FOREIGN PATENTS

| Number | Country | Date |
|---|---|---|
| 390,205 | France | July 22, 1908 |